US009891744B2

(12) United States Patent
Noto

(10) Patent No.: US 9,891,744 B2
(45) Date of Patent: Feb. 13, 2018

(54) CAPACITIVE DETECTING CIRCUIT, TOUCH DETECTING CIRCUIT AND SEMICONDUCTOR INTEGRATED CIRCUIT USING THE SAME

(71) Applicant: Synaptics Display Devices GK, Nakano-ku, Tokyo (JP)

(72) Inventor: Takayuki Noto, Nakano (JP)

(73) Assignee: Synaptics Japan GK, Tokyo (JP)

( * ) Notice: Subject to any disclaimer, the term of this patent is extended or adjusted under 35 U.S.C. 154(b) by 23 days.

(21) Appl. No.: 14/718,220

(22) Filed: May 21, 2015

(65) Prior Publication Data
US 2015/0338989 A1   Nov. 26, 2015

(30) Foreign Application Priority Data

May 26, 2014   (JP) .................... 2014-108151

(51) Int. Cl.
| | | |
|---|---|---|
| *G06F 3/045* | (2006.01) | |
| *G06F 3/041* | (2006.01) | |
| *G06F 3/044* | (2006.01) | |

(52) U.S. Cl.
CPC ............ *G06F 3/0416* (2013.01); *G06F 3/044* (2013.01); *G06F 3/0412* (2013.01)

(58) Field of Classification Search
CPC ...... G06F 3/044; G06F 3/0416; G06F 3/0412; H03K 17/19622; H03H 15/00
USPC ........................... 345/174; 324/609; 708/300
See application file for complete search history.

(56) References Cited

U.S. PATENT DOCUMENTS

| | | | | |
|---|---|---|---|---|
| 2010/0302183 | A1 | 12/2010 | Kogo et al. | |
| 2011/0025629 | A1* | 2/2011 | Grivna | G06F 3/0416 345/173 |
| 2011/0216031 | A1* | 9/2011 | Chen | G06F 3/044 345/174 |
| 2012/0287081 | A1* | 11/2012 | Akai | G06F 3/044 345/174 |
| 2013/0036147 | A1* | 2/2013 | Yan | H03H 15/00 708/300 |
| 2013/0307821 | A1 | 11/2013 | Kogo | |

\* cited by examiner

*Primary Examiner* — Kumar Patel
*Assistant Examiner* — Kuo Woo
(74) *Attorney, Agent, or Firm* — Patterson + Sheridan, LLP

(57) ABSTRACT

The touch detecting circuit is a capacitive detecting circuit correctable with a sensor capacitance, and includes an integration capacitance. In the touch detecting circuit, a sensor capacitance connected with the touch detecting circuit is charged and discharged; electric charges to input and output for charging and discharging the sensor capacitance are cumulatively added to the integration capacitance. The electric charges to he added to the integration capacitance are inverted in polarity according to directions of charge transfer accompanying the charge and discharge. Not only when charging the sensor capacitance, but also when discharging the sensor capacitance, the absolute values of electric charges to be moved are integrated and therefore, the amount of signals is doubled.

22 Claims, 9 Drawing Sheets

CAPACITIVE DETECTING CIRCUIT, TOUCH DETECTING CIRCUIT AND SEMICONDUCTOR INTEGRATED CIRCUIT USING THE SAME

CROSS-REFERENCE TO RELATED APPLICATIONS

The Present application claims priority from Japanese application JP 2014-108151 filed on May 26, 2014, the content of which is hereby incorporated by reference into this application.

BACKGROUND

The present invention relates to a capacitive detecting circuit, a touch detecting circuit, and a semiconductor integrated circuit using the same, and particularly to a semiconductor Integrated circuit which can be preferably used for a touch panel control circuit to be connected with a touch panel mounted superposed on a display panel.

A display panel used in a smart phone or a tablet terminal device has a touch panel superposed thereon; a user can manipulate the device by putting his or her finger or the like in contact with a display screen image (or touching or stroking a display screen image on the touch panel with his or her finger or the like). To detect the position where a touch is performed, various methods have been proposed. According to some exemplary electrostatic capacitance methods, a change in electrostatic capacitance which is caused by bringing a human finger or the like closer to sensor capacitances arranged on a touch panel like a matrix is detected, whereby a coordinate at which a touch is performed is detected. The electrostatic capacitance methods include a mutual capacitance method and a self-capacitance method. The mutual capacitance method uses, of electrodes forming sensor capacitances, one group of electrodes as transmission-side ones, and the other group of electrodes as reception-side ones, and takes advantage of the phenomenon that coupling capacitances produced between the transmission-side and reception-side electrodes are reduced by approach of a finger or the like. The self-capacitance method uses electrodes forming sensor capacitances, one group of electrodes of which are grounded or fixed in potential, and takes advantage of the phenomenon that a capacitance resulting from the approach of a grounded finger or the like to one of the sensor capacitances is added to the sensor capacitance experiencing the approach, thereby increasing the sensor capacitances.

The Japanese Unexamined Patent Application Publication No. JP-A-2011-14527 discloses a touch detecting circuit according to the self-capacitance method. In the self-capacitance method, electrodes of X-direction and electrodes of Y-direction are arranged as if forming a grid, and a sensor capacitance is formed at each intersection of the X- and Y-direction electrodes. The touch detecting circuit performs, on the capacitance selected by a combination of the X- and Y-direction electrodes, a charging action and a discharging action subsequent thereto to make a detection about a change in electrostatic capacitance.

JP-A-2013-242699 discloses a touch detecting circuit arranged by a combination of the self-capacitance method and the mutual capacitance method. In case that a multi-touch is detected according to the self-capacitance method, the touch detecting circuit detects touch coordinates according to the mutual capacitance method exclusively within a range of the touch electrodes involved in the multi-touch.

Prior to the invention, the inventor studied the touch detecting circuits disclosed by: JP-A-2011-14527; and JP-A-2013-242699.

SUMMARY

A method and apparatus for touch detection are provided. In one embodiment, a touch detecting circuit is provided. The touch detecting circuit is a capacitive detecting circuit connectable with a sensor capacitance, and includes an integration capacitor and circuitry operable to cumulatively add electric charges from the sensor capacitance to the integration capacitor. The circuitry is further operable to invert polarity of charges added to the integration capacitor according to directions of electric charge.

In another embodiment, the touch detecting circuit may be part of a semiconductor integrated circuit (IC).

In another embodiment, a capacitive detecting circuit connectable with a sensor capacitance is provided. The capacitive detecting circuit includes a first operational amplifier, an integration capacitor, an input switch and a touch panel controller. The integration capacitor is connected between a first input terminal of the first operational amplifier and an output terminal thereof so that its connection direction can he inverted. The input switch is connected between the sensor capacitance and the first input terminal of the first operational amplifier. The touch panel controller is configured to perform a series of the actions that include: charging the sensor capacitance to an initial potential, and short-circuiting and initializing the integration capacitor in an initialization period; closing the input switch after the initialization period; applying a first potential higher than the initial potential to a second input terminal of the first operational amplifier in a first period; and applying a second potential lower than the initial potential to the second input terminal of the first operational amplifier, and inverting the connection direction of the integration capacitor from that in the first period in a second period are repeated a predetermined number of times.

In yet another embodiment, a method for touch sensing is provided. The method includes (a) adding charge to an integration capacitor during a first period, the integration capacitor connected to a first input terminal of operational amplifier; and (b) inverting a polarity of the connection between the integration capacitor and the operational amplifier.

DETAILED DESCRIPTION

<Introduction>

Figure 1:
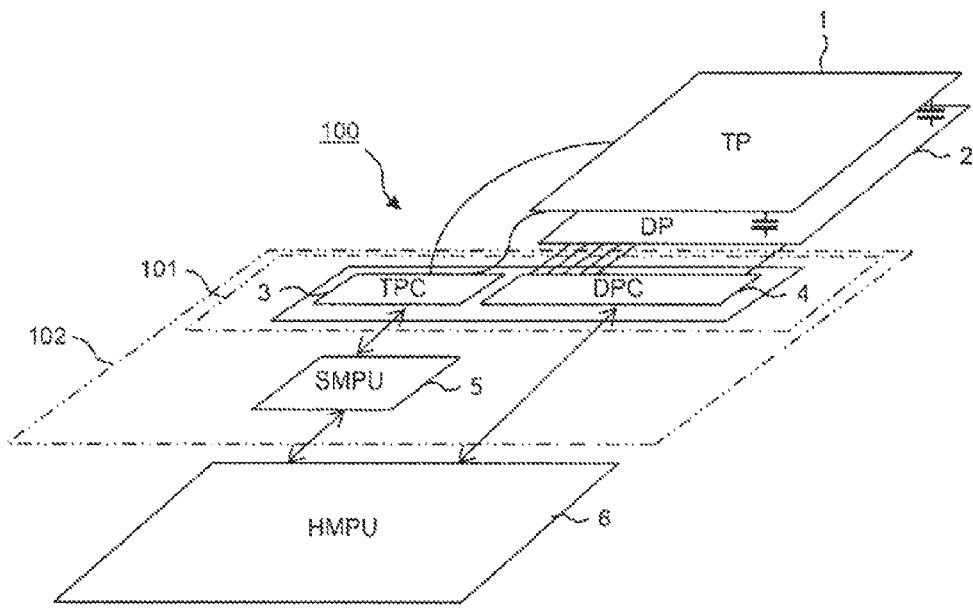
FIG. 1 is a block diagram showing a whole arrangement of a display-and-input device which is an example of an electronic device to which the invention is applied.

As a result of the study on the JP-A-2011-14527 and JP-A-2013-242699, it became clear that there are new problems as described below.

According to the self-capacitance method, a touch detecting circuit to be connected with a sensor capacitance includes: a voltage-applying circuit for charging the sensor capacitance; and a detecting circuit to which analog signals during discharge are input. The detecting circuit substantially measures a magnitude of the sensor capacitance (i.e. a capacitance value) by measuring the amount of an electric charge in case that the electric charge accumulated by the sensor capacitance is discharged. According to the self-capacitance method, the capacitance value of the sensor capacitance is effectively increased by experiencing a touch and as such, an increase owing to touching is targeted for detection in touch/non-touch detection. An increase of the capacitance value owing to experiencing a touch is not larger with respect to the capacitance value of the sensor capacitance with no touch, so a series of the actions of charging and discharging the sensor capacitance are repeated, and the amount of an electric charge at discharge is cumulatively added or integrated, thereby increasing the amount of signals. In a touch sensor disclosed in JP-A-2011-14527, the action of distributing an electric charge accumulated by a capacitor 6 having a large capacitance among sensor capacitances targeted for detection is repeated, thereby increasing the amount of signals. The same applies to the actions in IC (Integrated Circuit) for a touch panel which is disclosed by JP-A-2013-242699. In either case, in terms of the principle, an electric charge amount reflecting the capacitance value of the sensor capacitance is cumulatively added or subtracted, or integrated, thereby increasing the amount of signals.

In a circuit technique arranged so that the amount of signals is increased by repeating the actions of charging and discharging a sensor capacitance are repeated, and integrating an electric charge in discharge like this, the amount of signals to be integrated can be increased by increasing the number of the repetitions. However, such a circuit technique has the problem that the time for the detecting action is made longer in proportion thereto.

Making an attempt to perform a touch detection in order to adapt to the upsizing of touch panels, and the increase in the density of touch panel electrodes, the number of drive electrodes is increased. With such increase, the time allowed for the detecting action on one electrode is made shorter and thus, a required amount of signals to be integrated cannot be obtained.

A touch panel serving as an input device in a portable terminal device or the like is used in combination with a display panel of liquid crystal or the like. The forms of such combination are roughly classified into an on-cell form by which a touch panel as a separate part is externally attached to a display panel, and an in-cell form by which a touch panel is integrally formed in a display panel. In any combination form, the action of detecting a touch/non-touch by a touch panel will be performed while a display panel executes the display action. On this account, it is necessary to prevent drive signals of a display panel from being noise for the detecting action of a touch panel. For instance, in the case of performing the action of driving scan electrodes of a liquid crystal panel, the action of switching gradation data for driving signal electrodes, namely the so-called display driving action, and the touch detection action of a touch panel according to a time-division method, a length of time allowed for the touch detection, action of the touch, panel becomes shorter. It is considered that the higher gradation the display panel has, the longer the time for the display driving action is, and the time allowed for the touch detection action of the touch panel is made further shortened.

One advantage of at least some embodiments of the invention is the shortening of a working period for touch detection by a touch panel, and the increase in the touch detection accuracy.

Methods and apparatus for solving the problems as described above will be described below. The other problems of the invention and novel features thereof will be apparent from the description herein and the accompanying diagrams and charts.

One embodiment is as described below.

A capacitive detecting circuit may be provided that includes an integration capacitance, and is connectable with a sensor capacitance. The capacitive detecting circuit is arranged as followed.

The capacitive detecting circuit may be arranged so that the sensor capacitance can be charged and discharged, and electric charges to input and output for charging and discharging the sensor capacitance can be cumulatively added to the integration capacitance, and electric charges to be added to the integration capacitance according to directions of electric charge transfer accompanying the charge and discharge are inverted in polarity.

Advantages of at least some embodiments of the invention may include one or more of: increasing the amount of signals which can be integrated per unit time; and shortening of a working period for touch detection and the increase in the touch detection accuracy.

1. Summary of the Embodiments

First, summary of representative embodiments of the invention disclosed in the application will be described. Reference numerals in drawings in parentheses referred to in description of the summary of the representative embodiments just denote components included in the concept of the components to which the reference numerals are designated.

[1] <Capacitive Detecting Circuit Which Performs an Integrating Action Both in Charging and Discharging a Sensor Capacitance>

One of the representative embodiments disclosed in this application is a capacitive detecting circuit (10) which is connectable with a sensor capacitance ($C_{xy}$), and includes an integration, capacitor having an integration capacitance ($C_{s1}$). The capacitive detecting circuit is arranged as follows.

The sensor capacitance can be charged and discharged. Electric charges to input and output for charging and discharging the sensor capacitance can be cumulatively added to the integration capacitance. Electric charges to be added to the integration capacitance are inverted in polarity according to directions of electric charge transfer accompanying the charge and discharge.

According to the arrangement like this, the following become possible: to increase the amount of signals which can be integrated per unit time; to shorten a capacitance detecting action period; and to increase the detection accuracy.

[2] <Repetition of Charge and Discharge>

In the capacitive detecting circuit as described in [1], the integration capacitance is short-circuited and initialized each time repeating, by a predetermined number of times, the action of charging and discharging the sensor capacitance, and the act ion of inverting, in polarity, electric charges to be added to the integration capacitance according to the charge and discharge.

According to the arrangement like this, the following become possible: to make the sum of the number of charges and the number of discharges performed between initialization and the subsequent initialization of the integration capacitance the number of integrations; and to double the amount of signals which can be integrated in comparison to an integration circuit which performs the integration by only one of charge and discharge.

[3] <Dual Edge Type FIR+IIR>

The capacitive detecting circuit as described in [2] further includes an IIR (Infinite Impulse Response) filter (14) including switched capacitors. An electric charge accumulated by the integration capacitance is supplied to the IIR filter, and the integration capacitance is short-circuited and initialized each time repeating, by a predetermined number of times, the action of charging and discharging the sensor capacitance, and the action of inverting, in polarity, electric charges to be added to the integration capacitance according to the charge and discharge.

According to the arrangement like this, a circuit of the first stage including the integration capacitance can be made to work as an FIR (Finite Impulse Response) filter which samples electric charges both at working for the integration of the positive electrode direction, and at working for the integration of the negative electrode direction. The number of samplings by the FIR filter per unit time can be increased and therefore, a capacitive detecting circuit can be arranged to have a frequency property which enables the enhancement of noise suppression property. Further, the IIR filter which works as described above is provided in the subsequent stage and thus, a capacitive detecting circuit can be arranged to have a more effective noise suppression property by making the zero point of the FIR filter to coincide with the electrode of the IIR filter.

[4] <Touch Detecting Circuit>

A touch detecting circuit (3) includes a plurality of the capacitive detecting circuits (10_1 to 10_n) as described in any one of [1] to [3]. The plurality of the capacitive detecting circuits are connectable with a plurality of sensor capacitances arranged on a touch panel (1) respectively.

According to the arrangement like this, the following become possible: to shorten a working period for detection in detecting a change in sensor capacitance in a touch panel according to an electrostatic capacitance method; and to increase the detection accuracy.

[5] <Touch Controller IC>

A semiconductor integrated circuit (101, 102) includes: a single semiconductor substrate; and the touch detecting circuit (3) as described in [4] which is formed on the single semiconductor substrate.

According to the arrangement like this, a touch panel controller IC is provided, which includes a touch detecting circuit (3) short in its working period for detection and high in detection accuracy.

[6] <Touch Controller IC with Built-in Display Driver>

The semiconductor integrated circuit (101, 102) as described, in [5] further includes: a display drive circuit (4) on the semiconductor substrate, wherein the display drive circuit is capable of driving and controlling a display panel (2) with the touch panel superposed thereon on condition chat the display drive circuit is connected with the display panel.

According to the arrangement like this, IC (101, 102) having a display panel controller (4) and a touch panel controller (3) integrated therein is provided, which is connected with a display-touch panel having a display panel (2) and a touch panel (1) laminated into one body, and which makes easier to put the display-driving control and the touch-sensing control in cooperation with each other. Particularly, it is possible to maintain or increase the touch detection accuracy even in the case of a touch detection period which is shortened owing to execution of display driving and touch detection in a time-division manner.

[7] <Capacitive Detecting Circuit which Performs an Integrating Action Both in Charging and Discharging a Sensor Capacitance>

One of the representative embodiments disclosed in this application is a capacitive detecting circuit (10) correctable with a sensor capacitance (Cxy). The capacitive detecting circuit is arranged as described below.

The capacitive detecting circuit (10) includes: a first operational amplifier (AMP1); an integration capacitor (having an integration capacitance (Cs1)) connected between a first input terminal of the first operational amplifier and an output terminal thereof so that its connection direction can be inverted by changing the state of control circuitry; and an input switch (S2) connected between the sensor capacitance and the first input terminal of the first operational amplifier.

The capacitive detecting circuit charges the sensor capacitance to an initial potential (Vcharge), short circuits and initializes the integration capacitance, has an initialization period (t0 to t1), and after the initialization period, closes the input switch.

The capacitive detecting circuit repeats, by a predetermined number of times, a first period (t3 to t5, t7 to t9, and t1 to t13) in which a first potential (VHSP+$\Delta$V) higher than the initial potential is applied to a second input terminal of the first operational amplifier, and a second period (t5 to t7, t9 to t11, and so on) in which a second potential (VHSP) lower than the initial potential is applied to the second input terminal of the first operational amplifier, and the direction of connection of the integration capacitance is inverted from that in the first period.

According to the arrangement like this, the following become possible: increasing the amount of signals which can be integrated per unit time; shortening the working period for capacitance detection; and increasing the detection accuracy.

[8] <Dual Edge type FIR+IIR+Integrator>

The capacitive detecting circuit as described in [7] further includes an IIR filter (14) connected with the output terminal of the first operational amplifier through a sample-and-hold circuit.

The capacitive detecting circuit provides the initialization period each time repeating, by the predetermined number of times, the first period and the second period and in the initialization period, transmits an output of the first operational amplifier to the IIR filter through the sample-and-hold circuit.

According to the arrangement like this, as described in [3], the circuit of the first stage including the first operational amplifier and the integration capacitance can be made to work as an FIR filter which performs the sampling both at the time of the integrating action of the positive electrode direction and at the time of the integrating action of the negative electrode direction, whereby the noise suppression property can be enhanced. Using the FIR filter in combination with the IIR filter of the subsequent stage, the noise suppression property can be further enhanced.

[9] <Touch Detecting Circuit>

The touch detecting circuit (3) includes a plurality of the capacitive detecting circuits (10_1 to 10_n) as described in [7] or [8] the plurality of the capacitive detecting circuits are connectable with a plurality of sensor capacitances arranged on a touch panel (1) respectively.

According to the arrangement like this, the working period for touch detection can be shorten, and the detection accuracy can be increased in detecting a change in sensor capacitance in a touch panel of an electrostatic capacitance type,

[10] <Touch Controller IC>

The semiconductor integrated circuit (101, 102) as described in [8] further includes a display drive circuit (4) on the semiconductor substrate. The display drive circuit is capable of driving and controlling a display panel (2) on condition that the display drive circuit is connected with the display panel with the touch panel superposed thereon.

According to the arrangement like this, a touch panel controller IC is provided, which includes a touch detecting circuit short in the working period for detection and high in the detection accuracy.

[11] <Touch Controller IC With a Built-in Display Driver>

The semiconductor integrated circuit (101, 102) as described in [10] further includes a display drive circuit (4) on the semiconductor substrate. The display drive circuit is capable of driving and controlling a display panel (2) on condition that the display drive circuit is connected with the display panel with the touch panel superposed thereon.

According to the arrangement like this, an integrated IC is provided, which is connected with a display-touch panel formed by laminating a display panel and a touch panel into one body, and which makes easier to put the display-driving control and the touch-sensing control in cooperation with each other. Particularly, it is possible to maintain or increase the detection accuracy even in the case of a touch detection period which is shortened owing to execution of display driving and touch detection in a time-division manner.

2. Further Detailed Description of the Embodiments

The embodiments will be described further in detail.

[First Embodiment]

FIG. 1 shows, by example, the whole configuration of a display-and-input device 100 to which the invention is applied. The display-and-input device 100 shown in the diagram is an embodiment of an electronic device according to the invention, and forms a part of a portable terminal device, e.g., a PDA (Personal Digital Assistant) or mobile phone. The display-and-input device includes: a touch panel (TP) 1; a display panel (DP) 2; a touch panel controller (TPC) 3; a display panel controller (DPC) 4; a subprocessor (SMPU) 5; and a host processor (HMPU) 6. The touch panel controller 3 and the display panel controller 4 and as needed, the subprocessor 5 may be formed on one semiconductor chip, or may be packed in one package as, for example, a multi-chip module, which can be materialized as a single semiconductor device (IC) 101 or 102. Although no special restriction is intended, the semiconductor device (IC) 101 or 102 is formed on a single semiconductor substrate of silicon or the like by, for example, a known CMOSFET (Complementary Metal-Oxide-Semiconductor Field Effect Transistor) LSI (Large Scale Integrated circuit) manufacturing technique. Mounting the touch panel controller 3 and the display panel controller 4 in the form of a one-chip IC 101, it becomes easy to put the display-driving control and the touch-sensing control in cooperation with each other on condition that the one-chip IC 101 is connected to, for example, an in-cell type display-touch panel having a display panel 2 and a touch panel 1 laminated into one body. Further, integrating the subprocessor (SMPU) 5 in the same chip 102 together with the touch panel controller 3 and the display panel controller 4, it becomes easier to put the display-driving control and the touch-sensing control in cooperation with each other. As a result, the load on the host processor (HMPU) 6 which is attached to the chip 102 from the outside can be lightened.

The touch panel 1 has a plurality of sensor capacitances formed therein. The touch panel controller 3 acquires detection data depending on the variation in capacitance component on each sensor capacitance. The subprocessor (SMPU) 5, which is a microprocessor for a subsystem, controls the activation, of the touch panel 1, and performs a process for detecting a touch condition and a touch coordinate from detection data acquired by the touch panel controller 3. For instance, the subprocessor (SMPU) 5 performs a digital filter operation on detection data, performs an operation for calculating the center of weight of a two dimensional distribution of capacitance values from resultant data with noise removed therefrom and consequently, calculates a touch coordinate. In short, the subprocessor (SMPU) 5 calculates a coordinate at which a touch event has taken place for showing at what position the sensor capacitance is changed in capacitance value, namely at what position a finger is brought closer to the touch panel 1 (the touch panel is touched at, or the contact event is caused at).

The touch panel 1 includes an optically permeable (translucent) electrode and a dielectric film, and is arranged so that it is superposed on, for example, a display plane of the display panel 2. The touch panel 1 and the display panel 2 may be arranged in an in-cell type form in which they are integrated and mounted as one body, or an on-cell type form in which they are individually manufactured, superposed on each other, and mounted. Otherwise, they may be arranged in a cover glass-integrated structure in which the touch panel 1 and a cover glass to be set on an upper surface of the touch panel are unified.

The host processor (HMPU) 6 creates display data. The display panel controller 4 receives the display data from the host processor 6, and performs the display control and the display driving to display the display data on the display panel 2. The host processor 6 acquires coordinate data at the occurrence of a touch event from the sub-processor 5, and analyses an input by a manipulation on the touch panel 1 from the relation between coordinate data in the display panel 2, and a display screen image displayed on the display panel 2 by providing display data to the display panel controller 4.

Although no special restriction is intended, the host processor 6 has a communication control unit, an image-processing unit, an audio-processing unit and other parts including an accelerator, which are not shown in the diagram. The units and other parts are incorporated therein in the host processor or added thereto from the outside, thereby forming, for example, a portable terminal device (terminal device).

Figure 2:
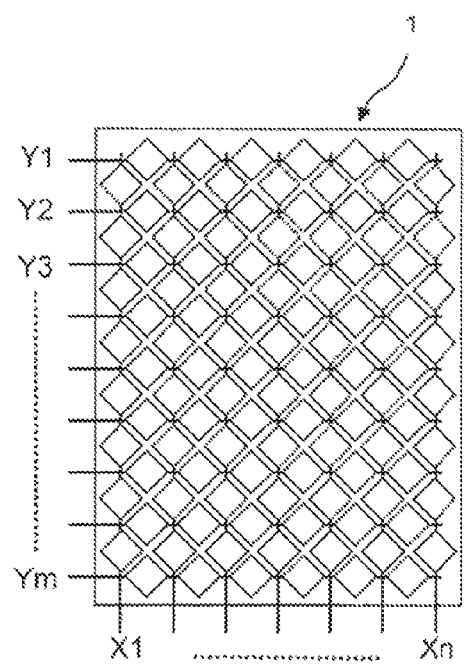
FIG. 2 is a plane view showing, by example, the electrode arrangement of a touch panel.

FIG. 2 shows, by example, the electrode arrangement of the touch panel 1. The touch panel 1 has a plurality of sensor electrodes formed thereon, which are composed of, for example, a number of drive electrodes (Y-electrodes) Y1 to Ym (also, represented, as "Y-electrode YM") formed in a crosswise direction, of the touch panel 1, and a number of detection electrodes (X-electrodes) X1 to Xn (also, represented as "X-electrode XN") formed in a lengthwise direction of the touch panel, and which are electrically insulated from one another. In the touch panel 1, a sensor capacitance is formed at each intersection where the X-electrodes and Y-electrodes intersect each other. According to the self-capacitance method, the capacitance value of each sensor capacitance is measured from one-side electrodes with the other-side electrodes fixed in potential to a predetermined value, whereby a touch/non-touch determination is performed on the location corresponding to the sensor capacitance, or a touch coordinate is calculated from a two dimensional distribution of the capacitance values. Although, no special restriction is intended, it is also possible to perform a touch/non-touch determination on the sensor capacitances in two dimensions by performing a touch/non-touch detection on each sensor capacitance from the X-electrodes with the Y-electrodes fixed in potential, or reversely performing a touch/non-touch detection on each sensor capacitance from the Y-electrodes with the electrodes fixed in potential. Arranging the touch panel 1 as described above, the touch/non-touch determination can be executed in combination with the touch/non-touch detection according to the mutual capacitance method. While the electrodes of the touch panel 1 shown in FIG. 2 each have a rhombic shape, they may have another shape, such as a shape arranged to form a grid-like pattern. Further, the touch panel. 1 may have detection electrode (X-electrode) pads distributed therein without the Y-electrodes; the detection electrode pads are arranged so that they are wired to X-electrode terminals X1 to Xn in one-to-one correspondence therewith in the touch panel 1.

Figure 3:
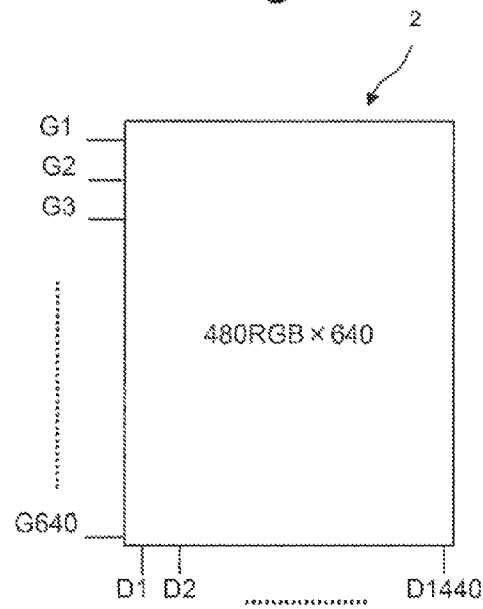
FIG. 3 is a plane view showing, by example, the electrode arrangement of a display panel.

FIG. 3 shows, by example, the electrode arrangement of the display panel 2. The display size of the display panel 2 shown in the diagram is as large as, for example, the scale of RGB 480×640 of VGA. The display panel 2 has: gate electrodes G1 to G640 as scan electrodes formed along a crosswise direction Thereof; drain electrodes D1 to D1440 as signal electrodes formed along a lengthwise direction; and a number of display cells disposed at crossing point portions where the gate and drain electrodes cross each other. Each display cell has a select terminal connected with the corresponding scan electrode, and an input terminal connected with the corresponding signal electrode. The gate electrodes G1 to G640 are driven (i.e. scan-driven) on condition that the display panel controller 4 applies scan pulses to the gate electrodes, for example, in the order of the array thereof. The drain electrodes D1 to D1440 are supplied with gradation data on scan-driven lines in synchronization with the scan-driving of the gate electrodes. The display size of the display panel 2 is not limited to the display size shown in the diagram, and it may he adequate one.

Figure 4:
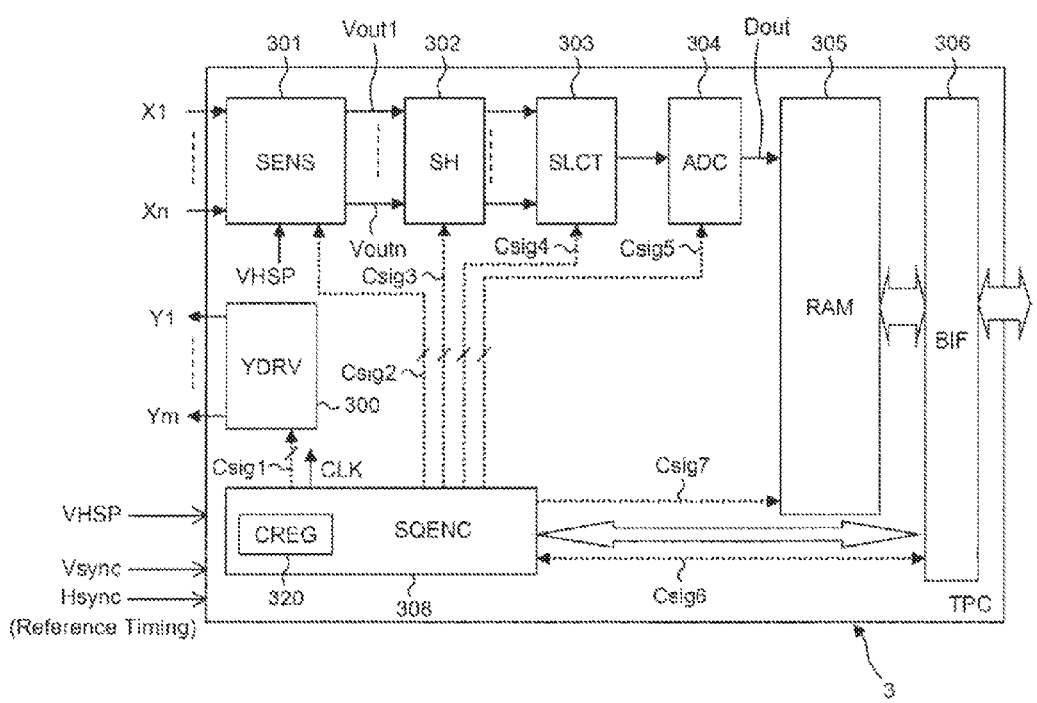
FIG. 4 is a block diagram showing, by example, a whole arrangement of a touch panel controller.

FIG. 4 shows, by example, the whole arrangement of the touch panel controller 3. The touch panel controller 3 has: a drive circuit (YDRV) 300; a touch detecting circuit (SENS) 301; a sample-and-hold circuit (SH) 302; a selector (SLCT) 303; an analog-to-digital converter (ADC, hereinafter abbreviated to "AD converter") 304; a RAM (Random Access Memory) 305; a bus-interface circuit (BIF) 306; and a sequence control circuit (SQENC) 308 serving as a control circuit. In one embodiment, the sequence control circuit (SQENC) 308 includes a control register (CREG) 320 which allows a control sequence to be set programmably. The control register (CREG) 320 may include non-volatile memory elements, or it may be arranged to include volatile memory elements so that, the subprocessor (SMPU) 5 or the like can initialize or appropriately change (overwrite) it.

The drive circuit 300 is provided for driving the Y-electrodes Y1 to Ym in performing the touch detection according to the mutual capacitance method. In the case of performing only the touch detection according to the self-capacitance method, the drive circuit 300 maybe omitted.

The touch detecting circuit 301 measures the capacitance values of the sensor capacitances connected with the X-electrodes X1 to Xn, and outputs voltages Vout1 to Voutn according to the capacitance values. The output voltages Vout1 to Voutn are held by the sample-and-hold circuit 302, and subjected to the selection by the selector 303. The selected output voltages are converted into digital detection data Dout by the AD converter 304. The detection, data after the conversion are accumulated in the RAM 305. The detection data accumulated by the RAM 305 are supplied to the subprocessor 5 through the bus-interface circuit 306, and used for calculation of a touch coordinate.

The sequence control circuit 308 uses control signals Csig1 to Csig6 to control the drive circuit 300, the touch detecting circuit 301, the sample-and-hold circuit 302, the selector 303, the AD converter 304, and the bus-interface circuit 306 in their actions. Further, the sequence control circuit 308 controls the access to the RAM 305 by use of a control signal Csig7. The sequence control circuit 308 accepts inputs of a vertical synchronizing signal Vsync and a horizontal synchronizing signal Hsync as timing reference signals from outside, for example. The sequence control circuit 308 performs a sequence control in synchronization with clocks CLK which are additionally input or produced therein. It is preferable to use the vertical synchronizing signal Vsync and the horizontal synchronizing signal Hsync for performing timing control between the display driving action by the display panel controller 4, and the touch detection action by the touch panel controller 3.

Figure 5:
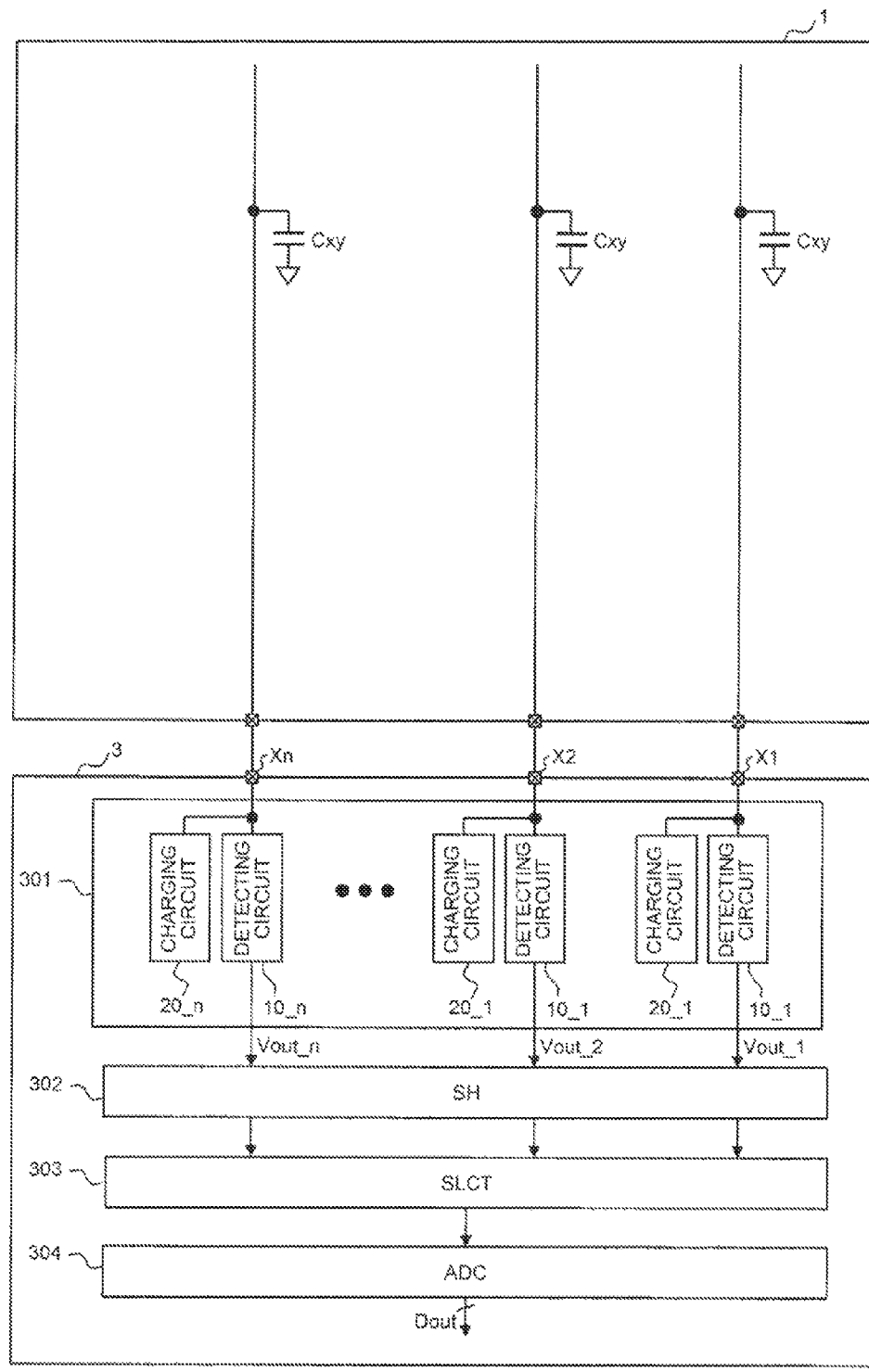
FIG. 5 is a block diagram showing an equivalent circuit of the touch panel, and an embodiment of the touch detecting circuit.

FIG. 5 shows the simplified equivalent circuit of the touch panel 1, and an embodiment of the touch detecting circuit 301. The touch detecting circuit 301 includes detecting circuits 10_1 to 10_n and charging circuits 20_1 to 20_n connected with the terminals X1 to Xn corresponding to the X-electrodes X1 to Xn respectively. There are various modifications as to the arrangement of the electrodes of the touch panel 1 and the sensor capacitances, but it is assumed in the embodiment shown in FIG. 5 that one sensor capacitance Cxy is connected with one combination of the detecting circuit 10 and the charging circuit 20 through one terminal (X1 to Xn). FIG. 5 is a diagram for schematically showing that the action of one detecting circuit is a measurement action electrically targeted for one sensor capacitance. In reality, the sensor capacitance may foe composed of a combined capacitance of more than one electrode; otherwise, the touch panel controller 3 having an additional select circuit or the like may be arranged so that one capacitance is sequentially selected from sensor capacitances and its capacitance value is measured. The outputs Vout1 to Voutn of the detecting circuits 10_1 to 10_n are transmitted to the sample-and-hold circuit (SH) 302, and held as voltage values there. The selector (SLCT) 303 sequentially selects the voltage values held by the sample-and-hold circuit (SH) 302 based on the control signal Csig4, and inputs the selected voltage values to the AD converter 304. The AD converter 304 sequentially converts voltage values held by the sample-and-hold circuit (SH) 302 into digital values Dout, and outputs them.

Now, the arrangement of the touch detecting circuit 301 and the action thereof will be described further in detail.

Figure 6:
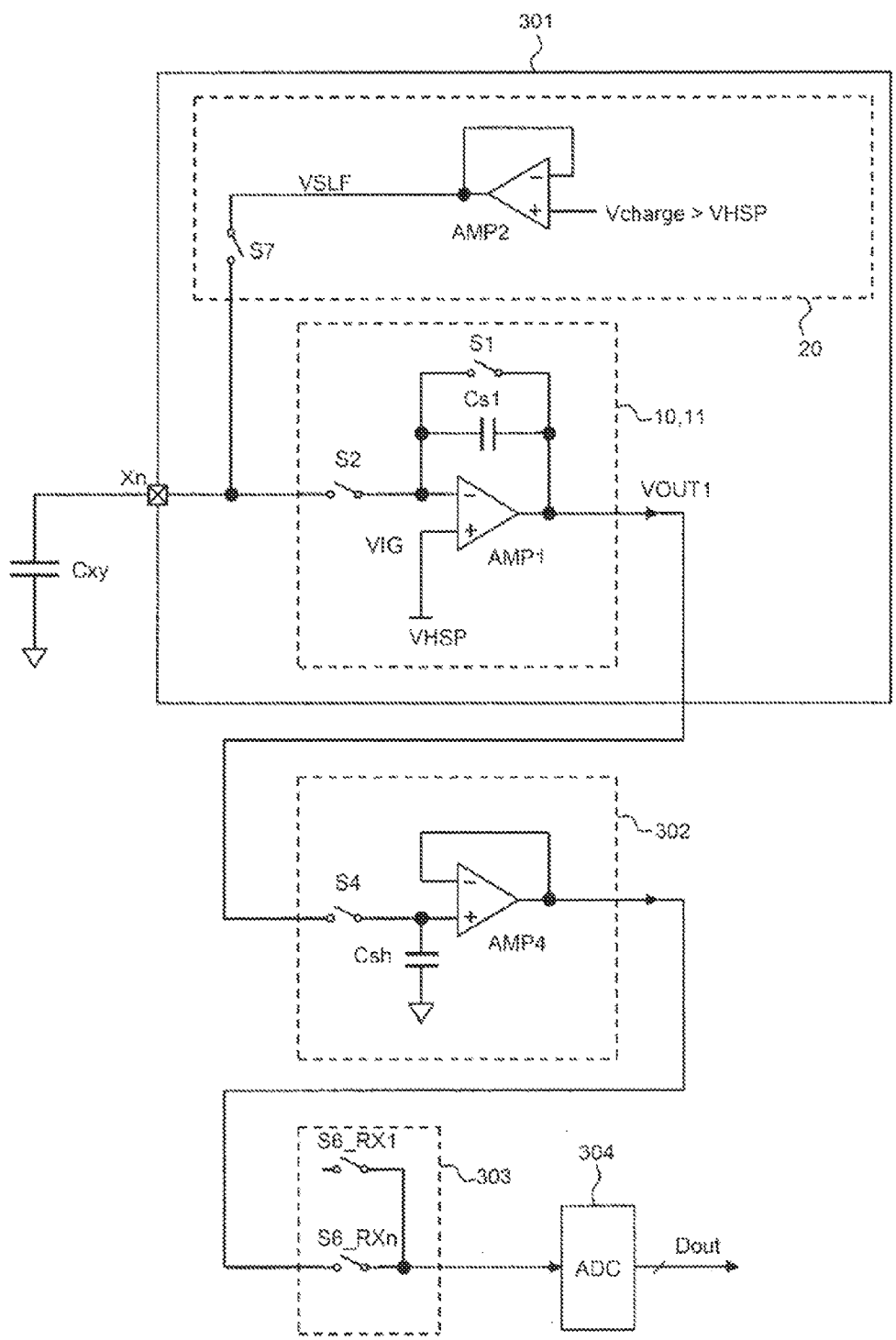
FIG. 6 is a circuit diagram showing, by example, the arrangement of a touch detecting circuit (capacitive detecting circuit) of a comparative example.

FIG. 6 is a circuit diagram showing, by example, the arrangement of a touch detecting circuit (capacitive detecting circuit) of a comparative example. Only a circuit which handles one sensor capacitance Cxy as a target for detection is shown in the diagram. The touch detecting circuit 301 includes a detecting circuit 10 and a charging circuit 20 which are connected to one sensor capacitance Cxy targeted for detection through the terminal Xn (which is any one of X1 to Xn). In addition, a circuit inside the sample-and-hold circuit 302 which an output VOUT1 of the touch detecting circuit 301 is input to and held by, and a circuit inside the selector 303 which selects a voltage held by the sample-and-hold circuit and supplies it to the AD converter 304 are also shown in FIG. 6.

The detecting circuit 10 is, for example, an integration circuit 11 as shown in the diagram. The detecting circuit 10 cumulatively adds up an electric charge input thereto and outputs. Specifically, the detecting circuit 10 serving as an integration circuit 11 includes: an operational amplifier AMP1 having a positive sleet rode-side input VIG (+) fixed to an initialization voltage VHSP, and arranged so that the virtual ground potential is set as VIG=VHSP; an integration capacitor having a capacitance Cs1 connected between the negative electrode-side input (−) of the operational amplifier AMP1 and its output terminal; an integration capacitor control switch S1 connected in parallel with the integration capacitor, and capable of discharging and initializing the integration capacitance Cs1 by short circuit; and a switch S2 for controlling ON/OFF of connection between the negative electrode-side input (−) of the operational amplifier AMP1, which serves as an input of the integration circuit 11, and the terminal Xn.

The charging circuit 20 includes: a voltage source VSLF; and a switch S7 for controlling ON/OFF of connection between the voltage source VSLF and the terminal Xn. The voltage source VSLF supplies a charging voltage Vcharge higher than the Initialization voltage VHSP in potential by use of a voltage follower amplifier arranged based on an operational amplifier AMP2.

While the sample-and-hold circuit 302 includes n sample-and-hold circuits for holding outputs Vout1 to Voutn of the detecting circuits 10_1 to 10_n, only one of such sample-and-hold circuits is shown in FIG. 6. The sample-and-hold circuit 302 includes: a switch S4; a sample-and-hold capacitance Csh; and an operational amplifier AMP4. The output VOUT1 of the detecting circuit 10 input through the switch S4 is held by the sample-and-hold capacitance Csh, and then output from a voltage follower amplifier including the operational amplifier AMP4.

The selector 303 includes n switches S6_RX1 to S6_RXn so that one output voltage is selected from output voltages Vout1 to Voutn held by and then output from the sample-and-hold circuit 302, and supplied to the AD converter 304 in turn. Of the switches S6_RX1 to S6_RXn, only two switches S6_RX1 and S6_RXn are shown in FIG. 6.

Figure 7:
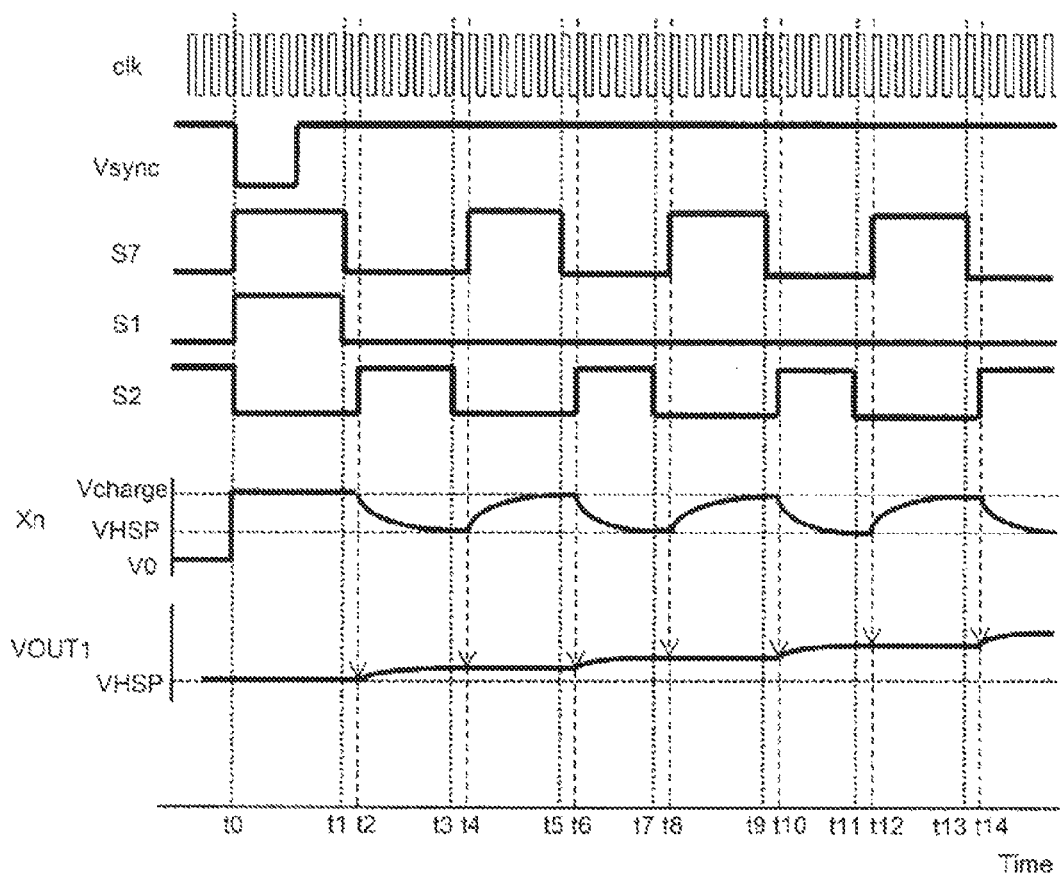
FIG. 7 is a timing chart showing, by example, the actions of the touch detecting circuit (capacitive detecting circuit) of FIG. 6.

FIG. 7 is a timing chart showing, by example, the action of the touch detecting circuit shown in FIG. 6. In the timing chart, the horizontal axis represents time (Time); and the vertical axis represents, from the top in a vertical axial direction thereof, a clock clk, a vertical synchronizing signal Vsync, and signals for controlling the switches S7, S1, and S2 in digital waveforms and further, a potential of the terminal Xn connected with the sensor capacitance Cxy targeted for detection, and an output voltage Vout in analog waveforms. The signals for controlling the switches S7, S1, and S2 adhere to a positive logic; the switches are closed (stay ON) with the signals at High level, whereas they are opened (stay OFF) with the signals at Low level.

The period of time t0 to t1 is a charging period during which the charging circuit 20 charges the sensor capacitance Cxy; during the charging period, the integration circuit 11 is initialized in parallel. For instance, closing the switch S7 at the time t0 when the vertical synchronizing signal Vsync is changed, the sensor capacitance Cxy is charged to the charging voltage Vcharge higher than the initialization voltage VHSP in potential through the terminal Xn. At the same time t0, the switch S2 which provides an input to the integration circuit 11 is opened to cut off the input from the terminal Xn, and the switch S1 is closed, whereby the integration capacitance Cs1 of the integration capacitor is short-circuited, discharged, and initialized and thus, the output VOUT1 is initialized to the initialization voltage VHSP. At the time t1, the switch S7 is opened to finish charging the sensor capacitance Cxy, and the switch S1 is opened to terminate the short circuit the integration capacitor and discharge of the integration capacitance Cs1 and to finish the initialization of the integration circuit 11.

In the subsequent period of time t2 to t3, the switch S2 is closed, and the sensor capacitance Cxy is connected with the input terminal of the integration circuit 11 forming the detecting circuit 10. The sensor capacitance Cxy is charged to the charging voltage Vcharge higher than the initialization voltage VHSP in potential, and the input of the integration circuit 11 is virtually grounded to the same initialization voltage VHSP as the positive electrode-side input of the operational amplifier AMP1 is grounded to and therefore, an electric charge expressed by (Vcharge−VHSP)×Cxy is input to (or caused to flow into) the integration circuit 11, and the amount of an electric charge thus input is accumulated by the integration capacitor. In the period of time t2 to t3, the potential of the terminal Xn which is the potential of the sensor capacitance Cxy is lowered from Vcharge to VHSP gradually and in parallel with this, the output VOUT1 of the integration circuit 11 is raised from the initialization voltage VHSP.

In the subsequent period (i.e. the second charging period) of time t4 to t5, the switch S7 is closed again, and then the sensor capacitor is charged to the charging voltage Vcharge through the terminal Xn. Unlike the period of time t0 to t1, the switch S1 is left open, and the initialization is not performed in this period. During this period, the switch S2 remains open, and the output VOUT1 of the integration circuit 11 is kept at the unchanged voltage since the time t4.

In the subsequent period (i.e. the second integration period) of time t6 to t7, the switch S2 is closed again, an electric charge is input to the integration circuit 11 from the sensor capacitor, and cumulatively added to the integration capacitance Cs1. As a result, the output voltage VOUT1 of the integration circuit 11 is further raised by an electric charge thus input.

After that, the charging period and the integration period are repeated by a predetermined number of times, like the third charging period of time t8 to t9, the third integration period of time t10 to t11; the fourth charging period of time t12 to t13, the fourth integration period after time t14, etc., whereby the electric charge (Vcharge−VHSP)×Cxy is cumulatively added up to the integration capacitance Cs1, which means that the predetermined number of the electric charge (Vcharge−VHSP)×Cxy is integrated in the integration capacitor as capacitance Cs1.

After the completion of the predetermined number of integrations, the switch S4 is closed, whereby the output voltage VOUT1 is transmitted to the sample-and-hold capacitance Csh of the sample-and-hold circuit 302, which is not shown in the timing chart. After that, as in the period of time t0 to t1, the switch S1 is closed, whereby the integration capacitance Cs1 is short-circuited, discharged, and initialized and then, the touch detecting circuit goes into the subsequent capacitance detection.

Figure 8:
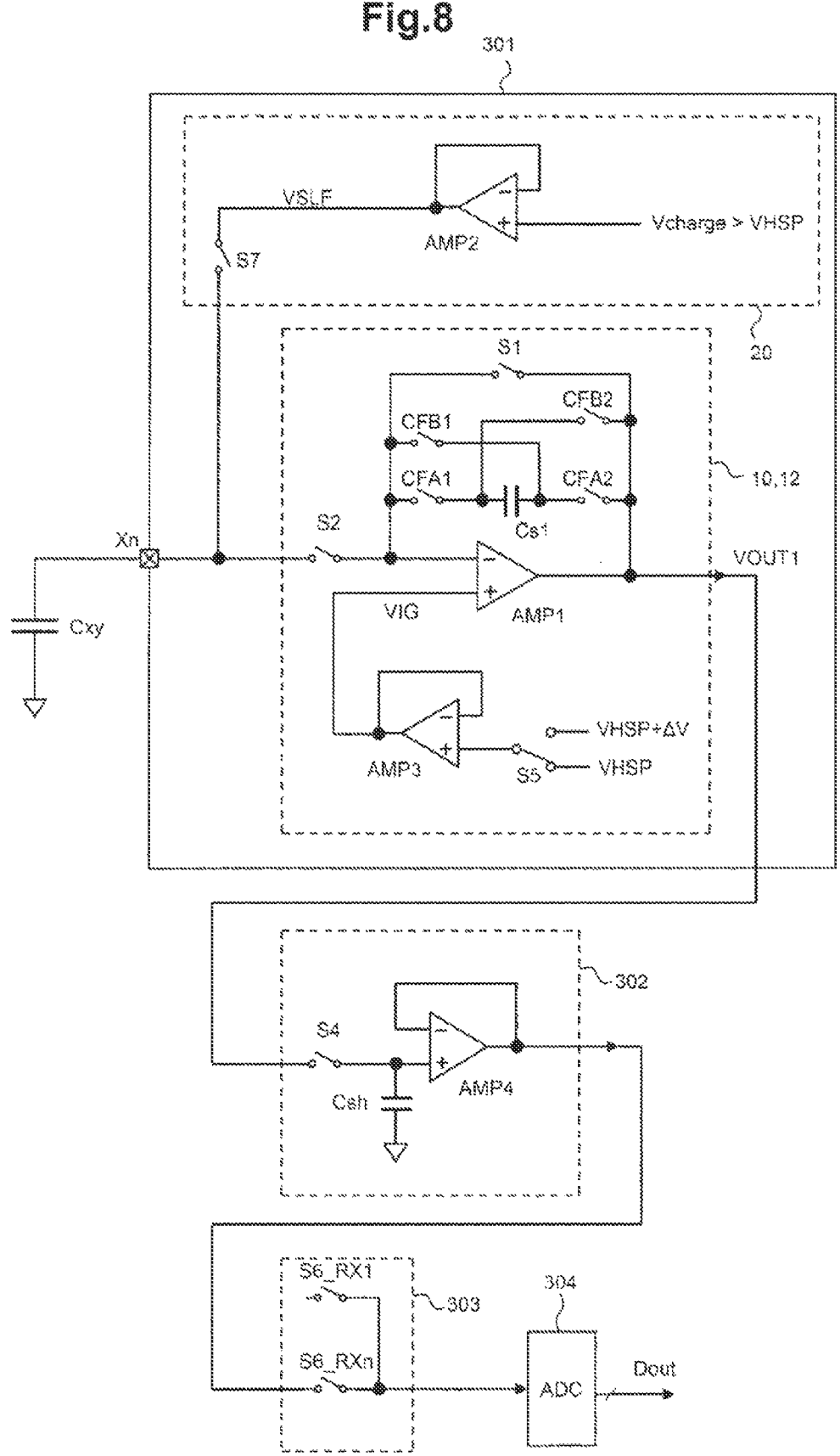
FIG. 8 is a circuit diagram showing, by example, the arrangement of the touch detecting circuit (capacitive detecting circuit) according to the first embodiment.

FIG. 8 is a circuit diagram showing, by example, the arrangement of the touch detecting circuit (capacitive detecting circuit) according to the first embodiment. In the diagram, only a circuit which handles one sensor capacitance Cxy as a target for detection is shown as in the touch detecting circuit (capacitive detecting circuit) of the comparative example shown in FIG. 6. The touch detecting circuit 301 includes a detecting circuit 10 and a charging circuit 20 which are connected to the sensor capacitance Cxy targeted for detection through the terminal Xn (one of the terminals X1 to Xn). In addition, a circuit which the output VOUT1 of the touch detecting circuit 301 is input to and held by in the sample-and-hold circuit 302, and a circuit which selects a voltage to be held and supplies the selected voltage to the AD converter 304 in the selector 303 are also shown in FIG. 8.

The detecting circuit 10 is, for example, a double edge type integration circuit 12 as shown in the diagram. The detecting circuit 10 includes an integration capacitor having an integration capacitance Cs1, and cumulatively adds up an electric charge input thereto by means of the integration capacitance Cs1 in absolute value and then outputs. Specifically, the detecting circuit 10 forming the double edge type integration circuit 12 includes; an input switch S2; an operational amplifier AMP1; an Integration capacitor having an integration capacitance Cs1; switches S1, CFA1, CFA2, CFB1, and CFB2; and a voltage follower amplifier including a switch S5 and an operational amplifier AMP3. The input switch S2 serves to control ON/OFF of connection between the negative electrode-side input (−) of the operational amplifier AMP1, and the terminal Xn. The integration capacitor having the integration capacitance Cs1 is connected between the negative electrode-side input (−) of the operational amplifier AMP1 and the output terminal, and used to form an integration circuit. The integration capacitor having the integration capacitance Cs1 is short-circuited, discharged, and initialized by the switch S1 connected in parallel therewith; the polarity of its connection with the operational amplifier AMP1 can be inverted by changing the state of control circuitry, for example, by changing (setting) the state of the switches CFA1, CFA2, CFB1, and CFB2. Specifically, the polarity of connection of the integration capacitance Cs1 and the operational amplifier AMP1 with the switches CFA1 and CFA2 closed and the switches CFB1 and CFB2 opened is inverted from that of the integration capacitance Cs1 with the switches CFA1 and CFA2 opened, and the switches CFB1 and CFB2 closed. The voltage follower amplifier including the switch S5 and the operational amplifier AMP3 serves to switch the voltage to be applied to the positive electrode-side input terminal of the operational amplifier AMP1 between the initialization voltage VHSP and the potential represented by VHSP+ΔV. That means that the virtual ground potential VIG of the operational amplifier AMP1 is switched between the initialization voltage VHSP and the potential VHSP+ΔV.

The charging circuit 20 includes a voltage source VSLF; and a switch S7 for controlling ON/OFF of connection between the voltage source VSLF and the terminal Xn as the charging circuit 20 of the comparative example shown in FIG. 6. The voltage source VSLF supplies a charging voltage Vcharge higher than the initialization voltage VHSP in potential by means of a voltage follower amplifier including the operational amplifier AMP2.

The sample-and-hold circuit 302, the selector 303, and the AD converter 304 which are in the subsequent stages to the detecting circuit 10 are the same as those in the comparative example shown in FIG. 6 and therefore, their descriptions will be omitted.

Now, the action of the touch detecting circuit according to the first embodiment will be described.

Figure 9:
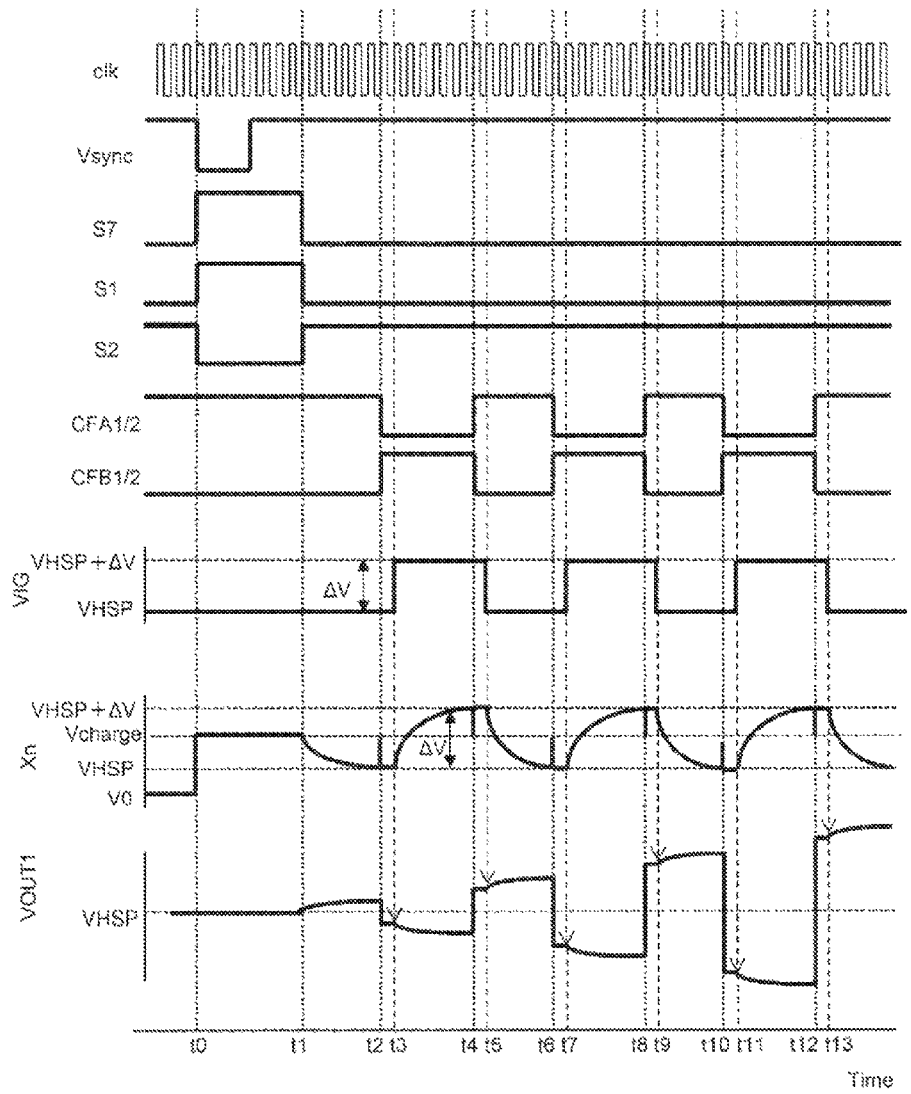
FIG. 9 is a timing chart showing, by example, the actions of the touch detecting circuit (capacitive detecting circuit) of FIG. 8.

FIG. 9 is a timing chart showing, by example, the action of the touch detecting circuit shown in FIG. 8. As in FIG. 7, the horizontal axis represents time (Time); and the vertical axial direction represents, from the top in a vertical direction thereof, a clock clk, a vertical synchronizing signal Vsync, and signals for controlling the switches S7, S1, S2, CFA1 and CFA2, and CFB1 and CFB2 in digital waveforms and further, a virtual ground potential VIG of the operational amplifier AMP1 of the double edge type integration circuit 12, a potential of the terminal Xn connected with the sensor capacitance Cxy, and an output voltage VOUT1 in analog waveforms. The signals for controlling the switches S7, S1, S2, CFA1 and CFA2, and CFB1 and CFB2 adhere to a positive logic; the switches are closed (stay ON) with the signals at High level, whereas they are opened (stay OFF) with the signals at Low level. Needless to say, the logic that the switches conform to can be readily changed to the negative logic.

The period of time t0 to t1 is a charging period during which the charging circuit 20 charges the sensor capacitance Cxy; during the charging period, the double edge type integration circuit 12 is initialized in parallel. For instance, closing the switch S7 at the time t0 when the vertical synchronizing signal Vsync is changed, the sensor capacitance Cxy is charged to the charging voltage Vcharge higher than the initialization voltage VHSP in potential through the terminal Xn. At the same time t0, the switch S3 which provides an input to the double edge type integration circuit 12 is opened to cut off the input, and the switch S1 is closed, whereby the integration capacitance Cs1 is short-circuited, discharged, and initialized and thus, the output VOUT1 is initialized to the initialization voltage VHSP. At the time t1, the switch S7 is opened to finish charging the sensor capacitance Cxy, and the switch S1 is opened to terminate the initialization of the integration circuit 12.

In the subsequent period of time t1 to t2, the switch S2 is closed, whereby the sensor capacitance Cxy is connected with the input terminal of the double edge type integration circuit 13 forming the detecting circuit 10. During this period, the initialization voltage VHSP is applied to the positive electrode-side input of the operational amplifier AMP1. Further, the sensor capacitance Cxy has been charged to the charging voltage Vcharge higher in potential than the initialization voltage VHSP, and the input of the double edge type integration, circuit 12 is virtually grounded to the initialization voltage VHSP and therefore, the potential of the terminal Xn which is the potential of the sensor capacitance Cxy is gradually lowered from Vcharge to the virtual ground potential VHSP (the sensor capacitance Cxy is discharged). During this time, an electric charge (Vcharge−VHSP)×Cxy for discharge of the sensor capacitance Cxy is input to the double edge type integration circuit 12, and accumulated by the integration capacitance Cs1. In parallel with this, the output VOUT1 of the double edge type integration circuit 13 is raised.

At the time t2, the switches CFA1 and CFA2 are opened (i.e. turned off), and the switches CFB1 and CFB2 are closed (i.e. turned on), thereby inverting the connection polarity of the integration capacitance Cs1. As a result of this, the output VOUT1 of the double edge type integration circuit 12 is caused to drop to a potential lower than the initialization voltage VHSP. At this time, the electric charge held by the integration capacitance Cs1 is not changed by the polarity inversion in quantity. Supposing that the potential of VOUT1 before the polarity inversion is VHSP+ΔV1, the potential of VOUT1 after the polarity inversion is VHSP−ΔV1. That is, the amount of the electric charge held by the integration capacitance Cs1 makes no difference from that in the condition that the electric charge is inverted in polarity while maintaining the absolute value of the electric charge. The change in potential is caused theoretically in no time. This is because neither charging nor discharging the capacitance accompanies the potential change. While the potential of the terminal Xn making the input terminal of the double edge type integration circuit 12 is raised in no time, accompanying the polarity inversion of the integration capacitance Cs1, the potential of the terminal Xn is turned back to the virtual ground level VHSP and stabilized.

At the time t3, the potential of the positive electrode-side input terminal of the operational amplifier AMP1, namely the virtual ground potential VIG is changed from the initialization voltage VHSP to the VHSP+ΔV by switching the switch S5. At this time, the initialization voltage VHSP is a potential lower than the charging voltage Vcharge of the sensor capacitance Cxy, whereas the VHSP+ΔV is a potential higher than the charging voltage Vcharge. In the period of time t3 to t4, the potential of the terminal Xn which is the potential of the sensor capacitance Cxy is raised from VHSP to VHSP+ΔV gradually (the sensor capacitance Cxy is charged). During this time, the negative electrode-side input terminal of the operational amplifier AMP1 is changed to be equal to the potential of the positive electrode-side input terminal which is the virtual ground level and therefore, an electric charge to charge the sensor capacitance Cxy is caused to flow into the sensor capacitance Cxy. In parallel with this, the electric charge to charge the sensor capacitance Cxy is cumulatively added up (integrated) by the integration capacitance Cs1, and the output VOUT1 of the double edge type integration circuit 12 is caused to further drop from VHSP−ΔV1 by a potential difference corresponding to the electric charge thus integrated. The potential of the output VOUT1 in this time is represented by VHSP−ΔV1−ΔV2.

At the subsequent time t4, the switches CFA1 and CFA2 are closed, the switches CFB1 and CFB2 are opened, whereby the polarity of connection of the integration, capacitance Cs1 is inverted again. In parallel with this, the output VOUT1 of the double edge type integration circuit 12 is inverted to a potential higher than the initialization voltage VHSP. At this time, the amount of an electric charge held by the integration capacitance Cs1 is not changed by the polarity inversion and therefore, the potential VHSP−ΔV1−ΔV2 of the output VOUT1 before the polarity inversion is made VHSP+ΔV1+ΔV2 after the polarity inversion. That is, the electric charge caused to flow into the double edge type integration circuit 12 from the sensor capacitance Cxy as a result of the discharge of the sensor capacitance Cxy during the period of time t1 to t2, and the electric charge caused to flow into the sensor capacitance Cxy from the double edge type integration circuit 12 as a result of charge of the sensor capacitance Cxy during the period of time t3 to t4 ere opposite no each other in charge transfer direction, but the absolute value of the amount of each electric charge is cumulatively added up (integrated) by the integration capacitance Cs1. While at the time t4, the potential of the terminal Xn forming the input terminal of the double edge type Integration circuit 12 is caused to drop in no time, accompanying the polarity inversion of the integration capacitance Cs1, the potential of the terminal Xn Is turned back to the virtual ground level VHSP+ΔV and stabilized.

As described above, the double edge type integration circuit 12 according to the first embodiment is arranged to be able to; charge and discharge the sensor capacitance Cxy; cumulatively add up, by the integration capacitance Csh, electric charges to be input and output for charging and discharging the sensor capacitance Cxy; and invert an electric charge to be added to the integration capacitance Csh in polarity according to the direction of charge transfer accompanying the charge and discharge.

In the comparative example shown by FIG. 7, an electric charge caused to flow into the integration circuit 11 by discharge is added to the integration capacitance Csh in the discharging period of the sensor capacitance Cxy of the time t2 to t3, whereas during the charging period of the time t4 to t5, the output VOUT1 of the integration circuit 11 remains unchanged because the integration circuit 11 is separated by the input switch S2 so as to prevent the outflow of an electric charge from the integration circuit 11 owing to the charging. In the comparative example, the integration is performed just once in each combination of one charge and one discharge of the sensor capacitance Cxy. In contrast, the double edge type integration circuit 12 according to the first embodiment is arranged to add up absolute values of electric charges in discharging and charging the sensor capacitance Cxy respectively and therefore, it can execute the integration (addition) twice in each combination of one charge of the sensor capacitance Cxy and one discharge thereof. Consequently, the following are made possible: doubling the amount of signals which can be integrated per unit time; shortening the period of the detecting action; increasing the detection accuracy.

At the times t5, t7, t9, t11, and t13 after the time t4, the actions of charging and discharging the sensor capacitance Cxy are repeated by controlling the switch S5 to alternately change the virtual ground potential VIG of the double edge type integration circuit 12 between VHSP and VHSP+ΔV. In addition, at the time t4, t6, t8, t10, and t12, the switches CFA1 and CFA2, and CFB1 and CFB2 are controlled to repeatedly invert the polarity of connection of the integration capacitance Cs1. An electric charge caused to flow into the double edge type integration circuit 12 from the sensor capacitance Cxy owing to the discharge of the sensor capacitance Cxy in each of the discharging periods of the time from t5 to t6, from t9 to t10, and after t13, and an electric charge caused to flow into the sensor capacitance Cxy from the double edge type integration circuit 12 owing to the charge of the sensor capacitance Cxy in each of the charging periods of the time t7 to t8, and t11 to t12 are opposite to each other in charge transfer direction, but the connection polarity of the integration capacitance Cs1 is inverted according to the charge transfer direction and therefore, the absolute value of the amount of each electric charge is cumulatively added up (integrated) by the integration capacitance Cs1.

The switch S4 is closed after the completion of a predetermined number of integrations and thus, the output voltage VOUT1 is transferred to the sample-and-hold capacitance Csh of the sample-and-hold circuit 302 and then output, which is not shown in the timing chart. After that, as performed in the period of the time t0 to t1, the switch S1 is closed, whereby the integration capacitance Cs1 is short-circuited, discharged, and initialized and then, the touch detecting circuit goes into the subsequent capacitance detection.

As described above, each time a series of the actions of charging and discharging the sensor capacitance Cxy, and the actions of inverting, in polarity, an electric charge added up by the integration capacitance Cs1 in response to the charging and discharging actions is repeated by a predetermined number of times. The Integration capacitance Cs1 is initialized by short circuit thereof.

In this way, the sum of the number of the charging actions and the number of discharging actions which are performed between the initialization of the integration capacitance Cs1 and the subsequent initialization thereof can be made equal to the number of the integrations. Therefore, the touch detecting circuit according to this embodiment allows the amount of signals which can be integrated to be doubled in comparison to the integration circuit 11 which performs the integration in response to either the charging action or the discharging action.

As described above, the double edge type integration circuit 12 can shorten the detection time for the touch detection, and can increase the detection accuracy on condition that it is provided in the touch detecting circuit (SENS) 301 of the touch panel controller (TPC) 3. The touch panel controller (TPC) 3 like this can be suitably applied to a display-and-input device 100 which performs a display driving action and a touch detecting action according to a time-division technique, in which the touch panel controller (TPC) 3 is connected with, for example, a touch panel 1 arranged integrally with a display panel 2 in an in-cell type structure. This is because the following are possible even though the time division shortens a length of time which can be allocated to the touch detection: doubling the amount of signals which can be integrated per unit time as described above; shortening the detection time for the touch detection; and increasing the detection accuracy. In such an example, a touch controller IC having the touch panel controller (TPC) 3 formed on a semiconductor substrate of silicon or the like may be provided, or such a touch controller IC may be integrated together with the display panel controller (DPC) 4 on one semiconductor chip. The arrangement like this facilitates a mutual cooperation between the display-driving control and the touch-sensing control.

The capacitive detecting circuit arranged by use of the double edge type integration circuit 12 according to the first embodiment can be materialized as a common capacitive detecting circuit in widespread use in addition to an embodiment arranged so that the capacitive detecting circuit is included in the touch detecting circuit (SENS) 301 of the touch panel controller (TPC) 3.

[Second Embodiment]

Figure 10:
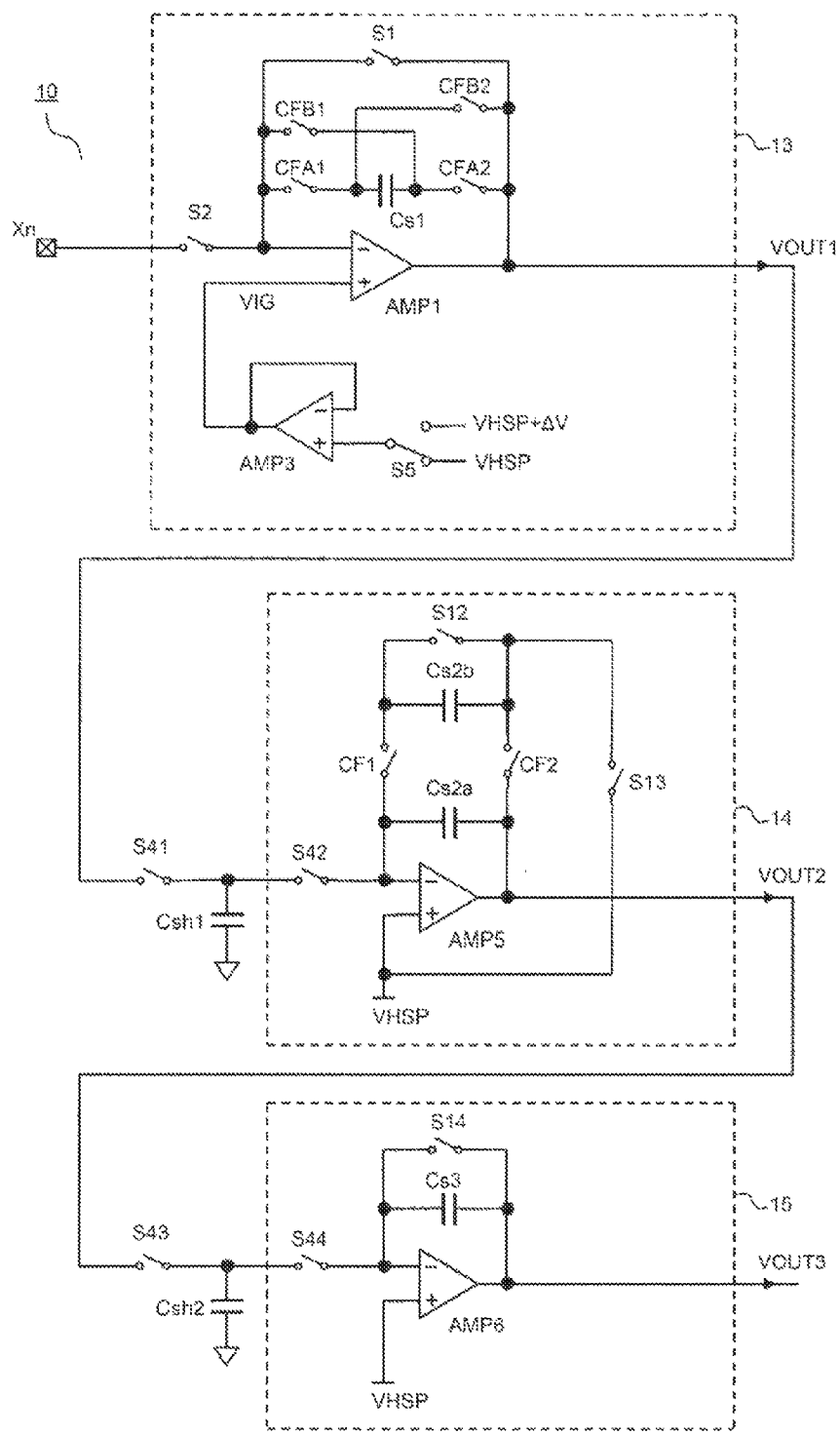
FIG. 10 is a circuit diagram showing, by example, the arrangement of a touch detecting circuit (capacitive detecting circuit) according to the second embodiment.

FIG. 10 is a circuit diagram showing, by example, the arrangement of a touch detecting circuit (capacitive detecting circuit) according to the second embodiment. The capacitive detecting circuit 10 further includes an IIR filter 14, and an integration circuit 15 in addition to a double edge type FIR filter 13 which is identical with the double edge type integration circuit 13 shown in FIG. 8 in structure and functions as an FIR filter. The output VOUT1 of the double edge type FIR filter 13 is connected with the IIR filter 14 of the subsequent stage through a switch S41 and a sample-and-hold circuit including a sample-and-hold capacitance Csh1. The output VOUT2 of the IIR filter 14 is connected with the integration circuit 15 of the subsequent stage through a switch S43 and a sample-and-hold circuit including a sample-and-hold capacitance Csh2. The output VOUT3 of the integration circuit 15 is input to a sample-and-hold circuit 302, passed through a selector (SLCT) 303, and then input to an AD converter 304 as shown in FIG. 8.

The double edge type FIR filter 13 is identical with the above-described double edge type integration circuit 12 in structure and as such, the description about the circuit structure is omitted. The double edge type FIR filter 13 integrates art electric charge input during a period between the initialization and the subsequent initialization, and functions as an FIR filter, of which the tap coefficient is one (1) for all taps, and the number of the integrations is equal to the number of taps.

The IIR filter 14 includes: an operational amplifier AMP5; two integration capacitances Cs2a and Cs2b; and switches S42, S12, S13, CF1, and CF2. The operational amplifier AMP5 has: a positive electrode-side input (+) fixed to the initialization voltage VHSP; and the integration capacitance Cs2a connected between the negative electrode-side input (−) and the output terminal. The switch S42 serves as an input switch, and for inputting a voltage value held by the sample-and-hold capacitance Csh1 to the negative electrode-side input terminal of the operational amplifier AMP5. The two integration capacitances Cs2a and Cs2b are connected in parallel through the switches CF1 and CF2; the integration capacitance of the integration circuit including the operational amplifier AMP5 consists of only the integration capacitance Cs2a on condition, that the switches CF1 and CF2 remain opened (in OFF), and the integration capacitance of the integration circuit is equal to the sum of the two integration capacitances Cs2a and Cs2b (Cs2a+Cs2b) on condition that the switches CF1 and CF2 remain closed (in ON). The switch S12 is connected in parallel with the integration capacitance Cs2b. Closing the switch S12, the integration capacitance Cs2b is short-circuited, discharged, and initialized. With the switches CF1 and CF2 both closed, the integration capacitances Cs2b and Cs2a are both short-circuited, discharged, and initialized by closing the the switch S12. In other words, the integration capacitances Cs2a and Cs2b are arranged so that they can be discharged by part (only Cs2b) of their capacitance values or all (Cs2a+Cs2b) of them according to control by the switches CF1, CF2, and S12. It is preferable to arrange the integration capacitances Cs2a and Cs2b so that their capacitance values can be changed by register setting. This is because the frequency property of the IIR filter is defined by the capacitance values of the integration capacitances Cs2a and Cs2b. The switch S13 is connected between the output terminal of the operational amplifier AMP5 and the initialization voltage VHSP through the switch CF2. Closing both of the switch S13 and the switch CF2, the output terminal of the operational amplifier AMP5 is initialized to the initialization voltage VHSP.

The integration circuit 15 includes: an operational amplifier AMP6; an integration capacitance Cs3; and switches S44 and S14. The operational amplifier AMP6 has a positive electrode-side input (+) fixed to the initialization voltage VHSP, and an integration, capacitance Cs3 connected between a negative electrode-side input (−) and an output terminal. The switch S44 serves as an input switch, and inputs a voltage value held by the sample-and-hold capacitance Csh2 to the negative electrode-side input terminal of the operational amplifier AMP6. The integration capacitor control switch S14 is connected in parallel with the integration capacitance Cs3; the integration capacitance Cs3 is short-circuited, discharged, and initialized by closing the switch S14.

Now, the action, of the touch detecting circuit according to the second embodiment will be described.

Figure 11:
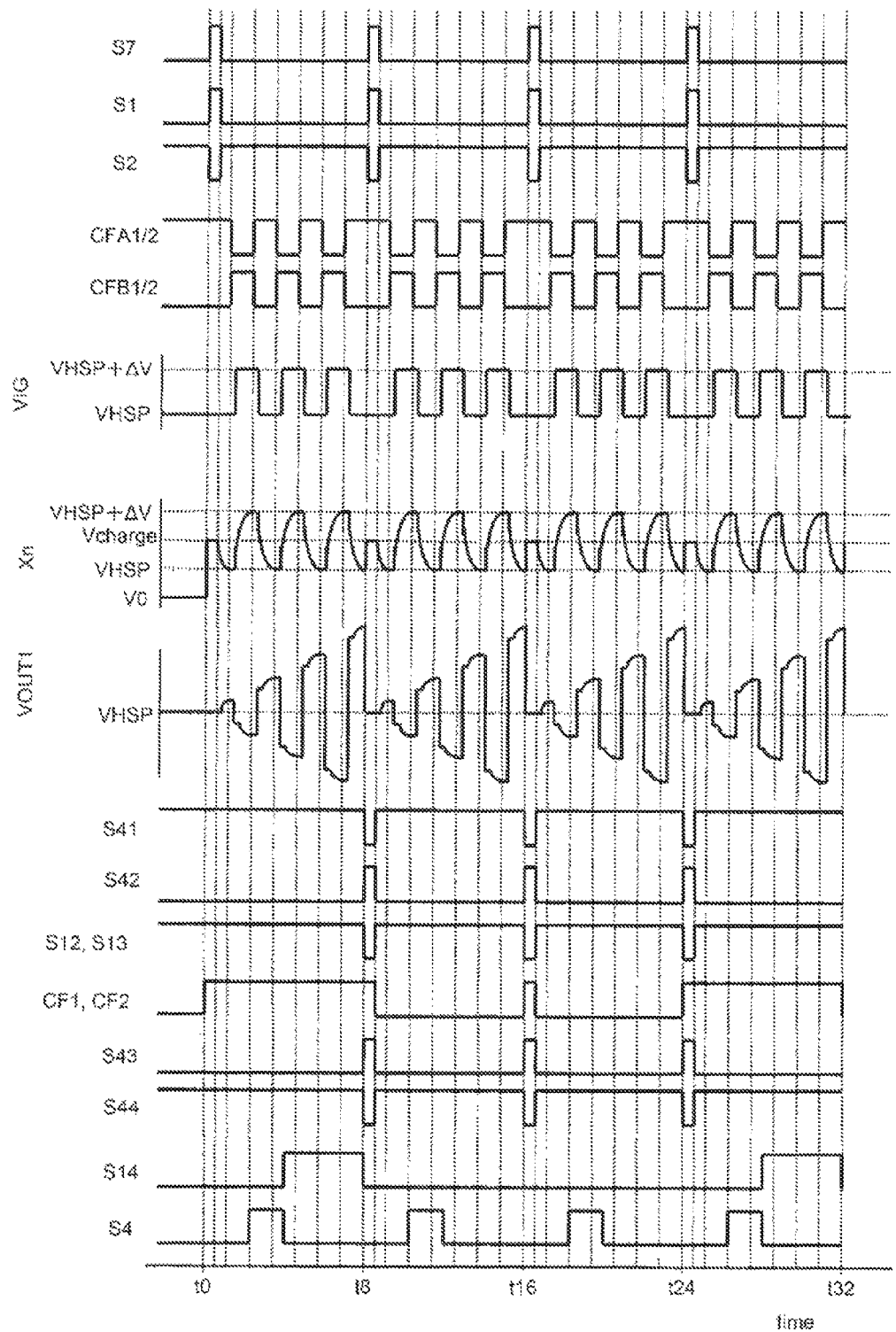
FIG. 11 is a timing chart showing, by example, the actions of the touch detecting circuit of FIG. 10.

FIG. 11 is a timing chart showing, by example, the action of the touch detecting circuit of FIG. 10. As in FIG. 9, the horizontal axis represents time (Time), and the vertical axial direction represents, from the top in a vertical direction thereof, signals for controlling the switches S7, S1, S2, CFA1 and CFA2, and CFB1 and CFB2 in digital waveforms, a virtual ground potential VIG of the operational amplifier AMP1 of the double edge type FIR filter 13, a potential of the terminal Xn connected with the sensor capacitance Cxy, and a voltage of the output VOUT1 in analog waveforms and further, signals for controlling the switches S41, S42, S12, S13, CF1, CF2, S43, S44, S14, and S4 in digital waveforms. The signals for controlling the switches adhere to a positive logic; the switches are closed (stay ON) with the signals at High level, whereas they are opened (stay OFF) with the signals at Low level. Needless to say, the logic that the switches conform to can be readily changed to the negative logic. Now, it is noted that notations of time along the horizontal axis are thinned out due to limitations of space.

The period of time t0 to t1 is a charging period during which the charging circuit 20 charges the sensor capacitance Cxy; during the charging period, the double edge type FIR filter 13 and the IIR filter 14 are initialized in parallel. At the time t0, the sensor capacitance Cxy is charged to the charging voltage Vcharge higher in potential than the initialization voltage VHSP through the terminal Xn. At the same time t0, the switch S2 which provides an Input to the double edge type FIR filter 13 is opened to cut off the input, and the switch S1 is closed, whereby the integration capacitance Cs1 is short-circuited, discharged, and initialized and thus, the output VOUT1 is initialized to the initialization voltage VHSP. At the time t1, the switch S7 is opened to finish charging the sensor capacitance Cxy, and the switch S1 is opened to terminate the initialization of the FIR filter 13. Also in the IIR filter 14, the switches CF1 and CF2 are closed to put the integration capacitances Cs2a and Cs2b to a condition in which they are connected in parallel; and the integration capacitances Cs2a and Cs2b are both short-circuited, discharged, and initialized by closing the switch S12.

In the period of time t1 to t8, the sensor capacitance Cxy is connected with the input terminal of the double edge type FIR filter 13 with the switch S2 closed. In this period, as in the period after the time t1 in the timing chart of FIG. 9, the virtual ground potential VIG of the operational amplifier AMP1 of the double edge type FIR filter 13 is changed between VHSP and VHSP+ΔV repeatedly, and the connection polarity of the integration capacitance Cs1 is inverted by changing the state of control circuitry, for example, by changing (setting) the state of the switches CFA1 and CFA2, and CFB1 and CFB2 according to the change. As the voltage of the terminal Xn connected with the sensor capacitance Cxy shows, the periods of time t1 to t2, time t3 to t4, time t5 to t6, and time t7 to t8 are each a discharging period, whereas the periods of time t2 to t3, time t4 to t5, and time t6 to t7 are each a charging period. The direction of charge transfer between the double edge type FIR filter 13 and the sensor capacitance Cxy is inverted according to repetition of the discharging and charging actions, and the integration capacitance is also inverted according to the repetition. Therefore, the absolute value of the amount of the electric charge is cumulatively added up (integrated) by the integration capacitance Cs1, and the amplitude (namely, the absolute value) of the output VOUT1 of the double edge type FIR filter 13 is cumulatively raised.

In the period of time t1 to t8, the output VOUT1 is sampled by the sample-and-hold capacitance Csh1 with the switch S41 closed. At the time t8, the switch S41 is opened and thus, the electric charge is held. Concurrently with this, the input switch S42 of the IIR filter 14 is closed, whereby the output VOUT1 of the double edge type FIR filter 13 is input to the IIR filter 14. In the period of time t8 to t9, the integration capacitances Cs2a and Cs2b are connected in parallel with the switches CF1 and CF2 closed and therefore, an electric charge corresponding to the output VOUT1 Input to the IIR filter 14 is accumulated by the integration capacitance Cs2a+Cs2b. In the period of time t9 to t16, the integration capacitances Cs2a and Cs2b are separated from each other with the switches CF1 and CF2 opened. Closing the switch S12, the integration capacitance Cs2b is short-circuited, and thus the electric charge accumulated by the integration capacitance Cs2b is discharged and wasted, and only the electric charge accumulated by the integration capacitance Cs2a remains. In the period of time t16 to t17, the switches CF1 and CF2 are closed again. Consequently, the integration capacitances Cs2a and Cs2b are connected in parallel, and an electric charge corresponding to the output VOUT1 input to the IIR filter 14 is cumulatively accumulated by the integration capacitance Cs2a+Cs2b. The output of the FIR filter which is currently input to the IIR filter 14 is added to the output Cs2a/(Cs2a+Cs2b) of the FIR filter which was input last, and the IIR filter works.

The outputs of the IIR filter 14 are held by the sample-and-hold capacitance Csh2 by closing the switch S43 in each of the periods of time t8 to t9, time t16 to t17 and time t24 to t25. In the periods of time t9 to t16, time t17 to t24 and time t25 to t32, the electric charges thus held are input to the integration circuit 15 in turn by closing the switch S44 and cumulatively added up (integrated) by the integration capacitance Cs3, and output as the outputs VOUT3. The outputs VOUT3 thus output are transmitted to the sample-and-hold circuit 302 with the timing in line with the time t10, the time t18, the time t26, etc., passed through the selector (SLCT) 303, and input to the AD converter 304 as shown in FIG. 8.

As described above, a circuit of the first stage including the integration capacitance Cs1 can be made to work as an FIR filter which samples electric charges both at working for the integration of the positive electrode direction accompanying the discharge of the sensor capacitance Cxy, and at working for the integration of the negative electrode direction accompanying the charge of the sensor capacitance Cxy. The number of samplings by the FIR filter per unit time can be increased and therefore, a capacitive detecting circuit can be arranged to have a frequency property which enables the enhancement of noise suppression property. Further, the IIR filter 14 which works as described above is provided in the subsequent stage and thus, a capacitive detecting circuit can be arranged to have a more effective noise suppression property by appropriately combining the frequency properties of the FIB filter 13 and the IIR filter 14, such as making the sere point of the FIR filter 13 to coincide with the electrode of the IIR filter 14.

A capacitive detecting circuit arranged by use of the double edge type FIR filter 13 according to the second embodiment can be materialized as a common capacitive detecting circuit in widespread use in addition to an embodiment arranged so that the capacitive detecting circuit is included in the touch detecting circuit (SENS) 301 of the touch panel controller (TPC) 3.

While the invention made by the inventor has been described above based on the embodiments specifically, the invention is not limited to the embodiments. It is obvious that various changes and modifications may be made without departing from the subject matter thereof.

For instance, the number of integrations, the control timing, and others described concerning the embodiments are just examples. Therefore, they may be changed or modified variously. Further, the invention is not limited by the electrode structure of the touch panel. In addition to this, the display panel (DP) 2 may be any one of a liquid crystal display panel, an organic EL display panel, and other types of display panels. Still further, in the case of a liquid
crystal display panel, the display panel (DP) 2 may be an amorphous silicon type one or a low-temperature polycrystalline silicon type one.

What is claimed is:

1. A capacitive detecting circuit configured to output an output signal depending on a sensor capacitance, the capacitive detecting circuit comprising:
    an operational amplifier having a first input to be connected to the sensor capacitance, a second input on which a virtual ground potential is generated, and an output outputting the output signal;
    an integration capacitor comprising first and second terminals;
    a first switch connected between the first terminal of the integration capacitor and the first input of the operational amplifier;
    a second switch connected between the second terminal of the integration capacitor and the first input of the operational amplifier;
    a third switch connected between the second terminal of the integration capacitor and the output of the operational amplifier; and
    a fourth switch connected between the first terminal of the integration capacitor and the output of the operational amplifier.

2. The capacitive detecting circuit according to claim 1 further comprising:
    a touch panel controller configured to charge and discharge the sensor capacitance, and invert, in polarity, electric charges to be added to the integration capacitor according to the charge and discharge.

3. The capacitive detecting circuit according to claim 2, further comprising:
    an IIR (Infinite Impulse Response) filter including switched capacitors,
    wherein electric charges accumulated by the integration capacitor is supplied to the IIR filter, and the integration capacitance is short-circuited and initialized each time repeating, by a predetermined number of times, the action of charging and discharging the sensor capacitance, and the action of inverting, in polarity, electric charges to be added to the integration capacitor according to the charge and discharge.

4. A touch detecting circuit comprising:
    a plurality of capacitive detecting circuits according to claim 1,
    wherein the plurality of the capacitive detecting circuits are connectable with a plurality of sensor capacitances arranged on a touch panel respectively.

5. A semiconductor integrated circuit comprising:
    a single semiconductor substrate; and
    the touch detecting circuit according to claim 4 formed on the single semiconductor substrate.

6. The semiconductor integrated circuit according to claim 5, further comprising:
    a display drive circuit on the semiconductor substrate, wherein the display drive circuit is capable of driving and controlling a display panel with the touch panel superposed thereon condition that the display drive circuit is connected with the display panel.

7. The capacitive detecting circuit according to claim 1, further comprising:
    a fifth switch connected between the first input and the output of the operational amplifier.

8. The capacitive detecting circuit according to claim 7, further comprising:
    an input switch connected between the first input of the operational amplifier and an input terminal connected to the sensor capacitance.

9. The capacitive detecting circuit according to claim 8, further comprising:
    a charging circuit configured to charge the sensor capacitance with a charging voltage.

10. The capacitive detecting circuit according to claim 9, further comprising:
    circuitry configured to supply a selected one of first and second voltages to the second input of the operational amplifier,
    wherein one of the first and second voltages is lower than the charging voltage, and
    wherein the other of the first and second voltages is higher than the charging voltage.

11. The capacitive detecting circuit according to claim 9, wherein, during an initialization period, the input switch is turned off with the fifth switch turned on, and the charging circuit is configured to charge the sensor capacitance with the charging voltage,
    wherein during a detecting period following the initialization period, the charging circuit stops charging the sensor capacitance and the input switch is turned on with the fifth switch turned off,
    wherein, during a first period of the detecting period, the first and third switches are turned on and the second and fourth switches are turned off, and
    wherein, during a second period of the detecting period, the second and fourth switches are turned on and the first and third switches are turned off.

12. A method for touch sensing using a capacitive detecting circuit including an integration capacitor and an operational amplifier, the method comprising:
    (a) connecting a sensor capacitance of a touch panel to a first input of the operational amplifier during a detecting period, wherein:
        a first switch is connected between a first terminal of the integration capacitor and the first input of the operational amplifier;
        a second switch is connected between a second terminal of the integration capacitor and the first in out of the operational amplifier;
        a third switch is connected between the second terminals of the integration capacitor and an output of the operational amplifier: and
        a fourth switch is connected between the first terminal of the integration capacitor and the output of the operational amplifier;
    (b) during a first period of the detecting period, connecting the first terminal of the integration capacitor to the first input of the operational amplifier and the second terminal of the integration capacitor to the output of the operational amplifier; and (c) during a second period of the detecting period, connecting the second terminal of the integration capacitor to the first input of the operational amplifier and the first terminal of the integration capacitor to the output of the operational amplifier.

13. The method of claim 12 further comprising:
charging the sensor capacitance to an initial potential during an initialization period before the detecting period, wherein the sensor capacitance is disconnected from the first input of the operational amplifier during charging of the sensor capacitance.

14. The method of claim 13 further comprising:
short-circuiting the integration capacitor during the initialization period.

15. The method of claim 12 further comprising:
coupling the output of the operational amplifier to a sample and hold circuit after accumulating charge on the integration capacitor by performing (b) and (c) a predefined number of times.

16. The method of claim 12, wherein, in performing (b) and (c), states of one or more switches coupled between the integration capacitor and the operational amplifier are changed.

17. The method of claim 12 further comprising:
driving the touch panel from circuits disposed on a substrate containing circuits controlling (a), (b), and (c).

18. The method of claim 12 further comprising:
providing an output signal of the operational amplifier to an Infinite Impulse Response (IIR) filter.

19. The method of claim 12, wherein electric charges accumulated by the integration capacitor are supplied to an Infinite Impulse Response (IIR) filter, and wherein the integration capacitor is short-circuited and initialized each time when repeating (b) and (c) a predetermined number of times.

20. The method of claim 13, wherein (b) and (c) each comprise:
applying a first potential higher than the initial potential to a second input terminal of the operational amplifier; and
applying a second potential lower than the initial potential to the second input terminal of the operational amplifier.

21. The capacitive detecting circuit according to claim 10, wherein, in a charging period, the input switch is turned off with the fifth switch turned on, and the charging circuit is configured to charge the sensor capacitance with the charging voltage,
wherein during a detecting period following the charging period, the charging circuit stops charging the sensor capacitance and the input switch is turned on with the fifth switch turned off,
wherein, during a first period of the detecting period, the first and third switches are turned on and the second and fourth switches are turned off,
wherein, during a second period of the detecting period, the second and fourth switches are turned on and the first and third switches are turned off,
wherein, during a first part of the first period, the circuitry supplies one of the first and second voltages to the second input of the operational amplifier,
wherein, during a second part of the first period following the first part, the circuitry supplies the other of the first and second voltages to the second input of the operational amplifier,
wherein, during a third part of the second period, the circuitry supplies the other of the first and second voltages to the second input of the operational amplifier, and
wherein, during a fourth part of the second period, the circuitry supplies the one of the first and second voltages to the second input of the operational amplifier.

22. The capacitive detecting circuit according to claim 11, further comprising:
an IIR filter connected with the output of the operational amplifier through a sample-and-hold circuit,
wherein during the initialization period, the output signal output from the operational amplifier is transmitted to the IIR filter through the sample-and-hold circuit.

* * * * *